United States Patent [19]
Ryan et al.

[11] Patent Number: 5,404,782
[45] Date of Patent: Apr. 11, 1995

[54] BAKERY PRODUCT SLICING MACHINE

[75] Inventors: John E. Ryan, Hillsboro; Neil S. Arney, Tigard, both of Oreg.

[73] Assignee: Ryan Technology, Inc., Hillsboro, Oreg.

[21] Appl. No.: 105,185

[22] Filed: Aug. 12, 1993

[51] Int. Cl.6 .............................. B26D 3/08
[52] U.S. Cl. ............................. 83/873; 83/874; 83/444; 83/449; 83/508.2
[58] Field of Search .......... 83/870, 872, 873, 874, 83/885, 508.2, 420, 421, 444, 449, 698.61, 699.61

[56] References Cited

U.S. PATENT DOCUMENTS

| | | | |
|---|---|---|---|
| 1,258,599 | 3/1918 | Moore | 83/420 X |
| 2,347,007 | 4/1944 | Tod | 83/872 |
| 2,803,279 | 8/1957 | Strand | 83/873 |
| 3,112,780 | 12/1963 | Lecrone | 83/873 |
| 3,731,571 | 5/1973 | Larson et al. | 83/420 |
| 4,220,065 | 9/1980 | Stanford | 83/873 |

Primary Examiner—Eugenia Jones
Attorney, Agent, or Firm—Kolisch, Hartwell, Dickinson, McCormack & Heuser

[57] ABSTRACT

A cutting apparatus for slicing bakery products. Two circular cutting blades powered by respective motors are relatively positionable toward and away from each other in a cutting station. One cutting blade may be shifted to remove it from the cutting station when making cuts using only the other blade.

4 Claims, 4 Drawing Sheets

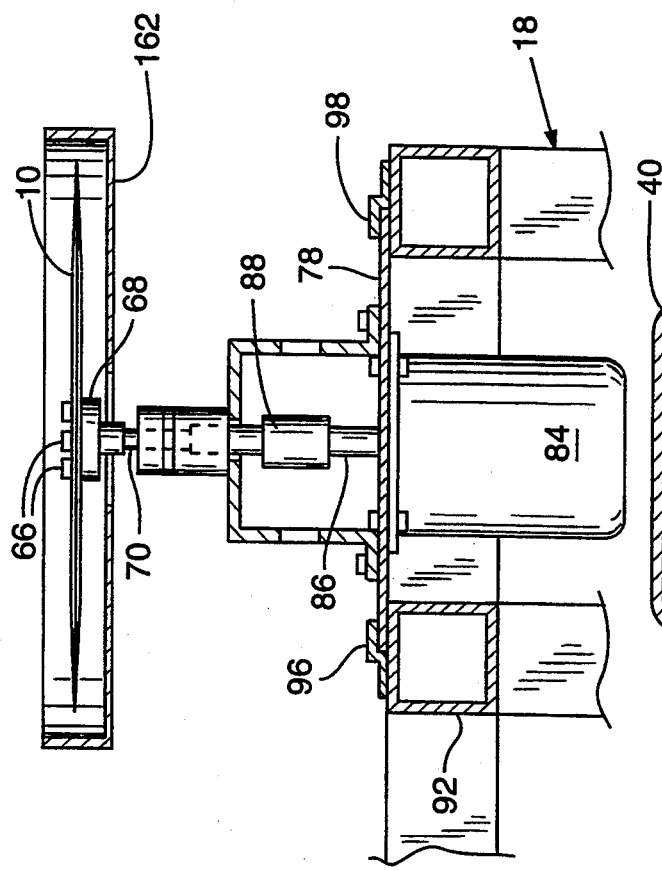
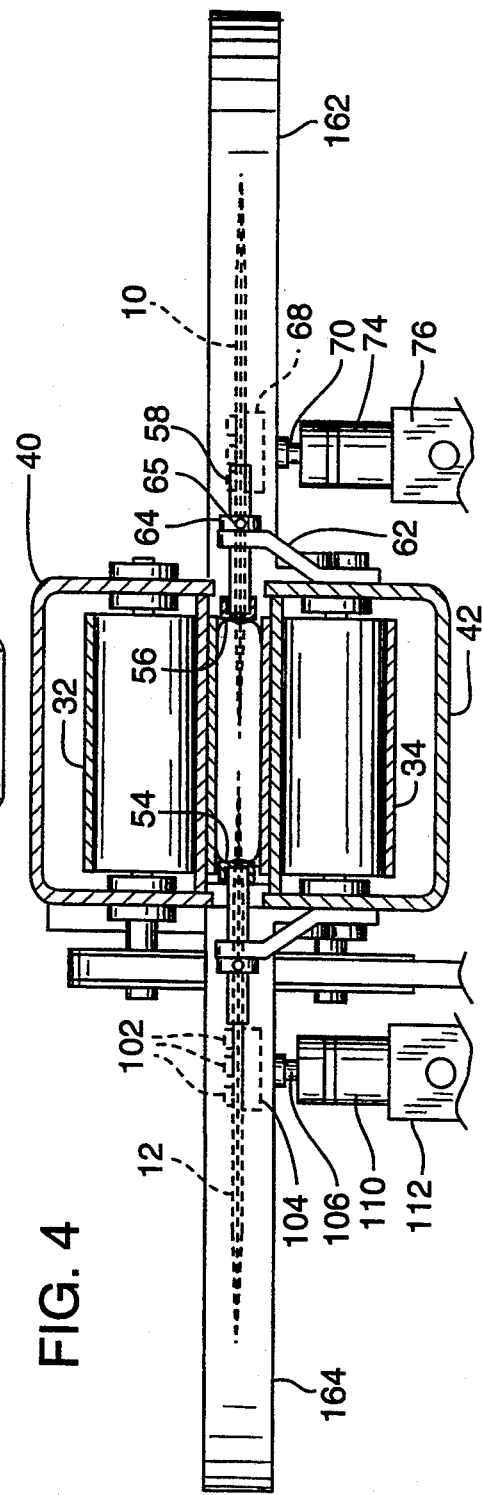
FIG. 3
FIG. 4

5,404,782

BAKERY PRODUCT SLICING MACHINE

BACKGROUND AND SUMMARY OF THE INVENTION

This invention relates to bakery cutting apparatus, and more particularly to apparatus for cutting or slicing bakery products, such as bagels, buns or rolls, prior to packaging and sale. Frequently, a bakery will slice a product to make it easier for the customer to open up the product for such a purpose as toasting, preparing a spread, preparing a sandwich, etc. There are two well-known types of slices that are imparted to a product. One is what is known as a butterfly slice, where cuts are made inwardly from opposite sides of the product, and with the leaving of an unsliced joinder region in the middle of the product where the cuts have not penetrated. The other type of slice is produced by a cut made into the product from one side only. A hinge-type slice results where the cut is not entirely through the product, and a small joined region is left at the opposite side of the product from where the cut is made. With this type of slice, product halves are made that are swingable to an open position in a hinge-type action.

A general object of this invention is to provide an improved bakery product slicing machine which can be employed in making these common types of slices, namely, a butterfly slice with slices or cuts in from opposite sides of the product, and a hinge-type slice (or complete severing of the product), where a slice or cut enters in from one side only.

Another object is to provide a slicing machine for bakery products and the like which is relatively easily adjusted between conditions for making a butterfly-type slice and a hinge-type slice.

A further object is to provide such a slicing machine characterized by a fast and reliable operation, with slicing occurring in product passing serially through a slicing station, with opposed cutters entering into the slicing station from opposite sides, or in the alternative, with a single cutter only used to produce the slicing action.

Yet another object is to provide a cutter machine which is adjustable between these two types of operations which is safe to use.

These and other objects and advantages are attained by the invention, which is described hereinbelow in conjunction with the accompanying drawings, wherein:

FIG. 3 is a cross-sectional view, taken generally along the line 3—3 in FIG. 1, and illustrating further details of a mounting for a cutter and its motor in the apparatus;

FIG. 4 is a view taken along the line 4—4 in FIG. 1;

DETAILED DESCRIPTION OF THE PREFERRED EMBODIMENT

Figure 1:
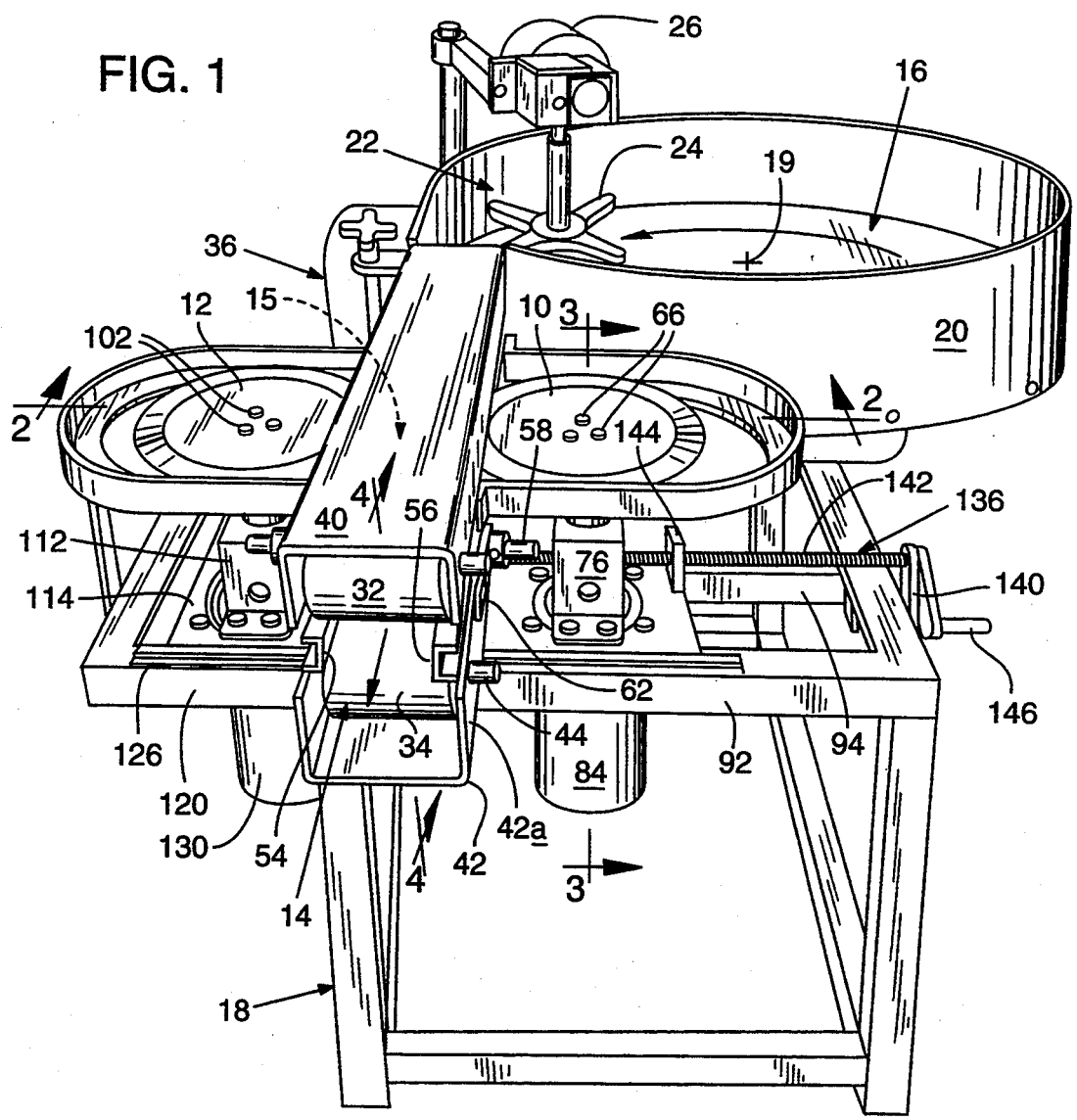
FIG. 1 is a perspective view illustrating a slicer or slicing apparatus constructed according to an embodiment of the invention.

The apparatus illustrated is a machine having a pair of rotatable blades, such as those shown in 10 and 12 in FIG. 1, for cutting bakery products such as English muffins, bagels, hamburger buns, etc., carried on a conveyor system 14 past a cutting station 15. The bakery products are fed one at a time into the conveyor system from a collector-dispenser table 16. The cutter blades, and the conveyor system and table, are shown suitably supported on a framework 18 which supports the elements described at a proper elevation above the ground.

Table 16 is circular in outline, and rotatable about an upright axis 19 passing through its center. Extending about the periphery of the table, and suitably supported in a stationary position on frame 18 is an upstanding wall 20.

Bakery products prior to slicing are collected on table 16. A power-driven kicker device, in the form of a star wheel 22, with radiating arms 24, is rotated in a controlled manner by motor 26. Wheel 22 functions to feed bakery products, one at a time, into the feed end of conveyor system 14.

Figure 5:
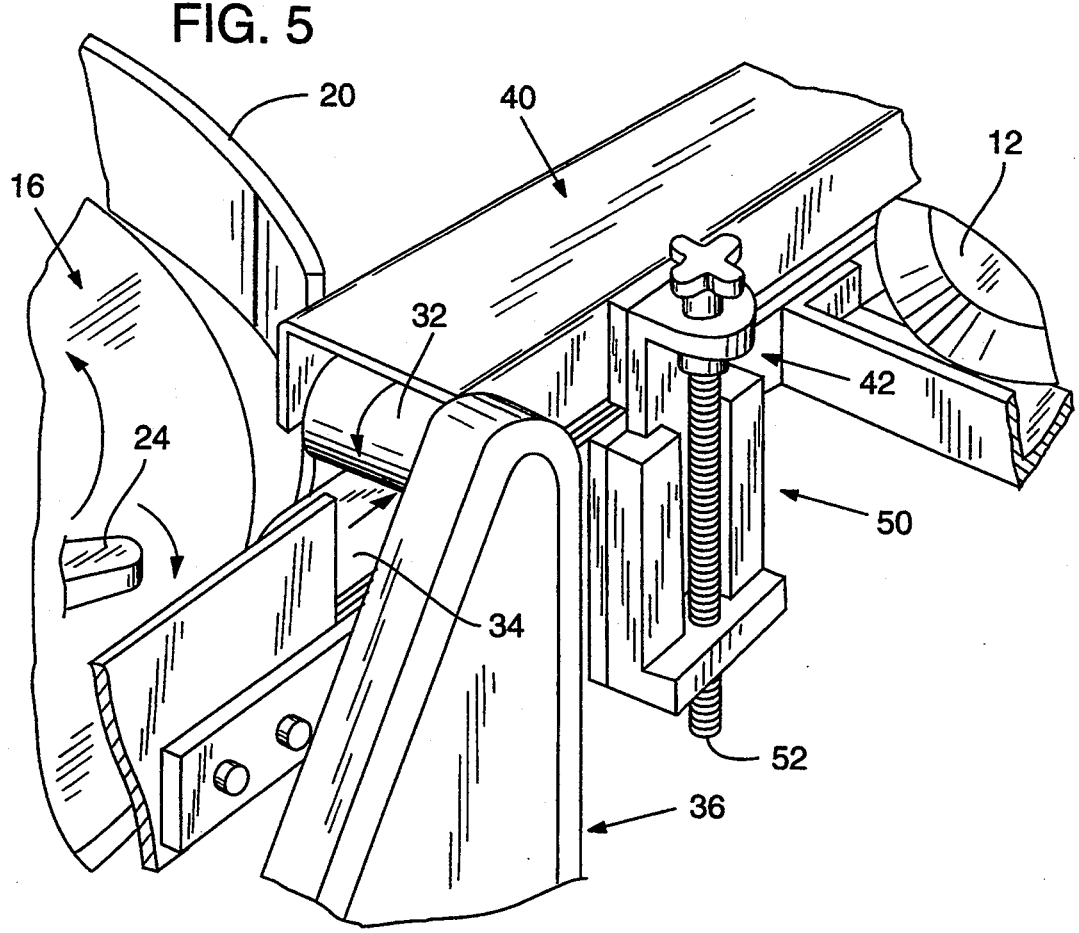
FIG. 5 is a perspective view illustrating portions of the feed end of a conveyor system provided for feeding bakery products through a cutting station in the apparatus.

The conveyor system includes a pair of elongate continuous conveyor belts, namely, upper belt 32 and lower belt 34 illustrated in FIG. 5. The belts are disposed with the lower run of the upper belt opposite the upper run of the lower belt, and are rotated under power by suitable means, such as the motor drive partially illustrated at 36 in FIGS. 1 and 5. Belt movement is with their opposed runs moving from left to right in FIG. 5, or toward the viewer in FIG. 1.

Extending in covering relation over the belts is an upper shield element 40 of channel-shaped cross section, and a lower shield element 42, also of channel-shaped cross section. The belts are supported on suitable rollers and these rollers are rotatably mounted, as by mounting 44, in the upstanding flanges of the shield element, as exemplified by flange 42a.

The spacing between the opposed runs of the belts may be adjusted with adjustable mechanism 50 (see FIG. 5), which includes manually adjustable screw 52 which is turned to raise or lower the upper shield element relative to the lower element (which is secured to the frame).

Product moved along by conveyor system 14 is guided on opposite margins by elongate fence elements 54, 56 (see FIG. 1) disposed in the space between the belts, with one adjacent one set of margins of the belts and the other adjacent the opposite set of margins of the belts. Each of the fences is adjustable in a lateral direction, which is to say in a direction extending transversely of the belts. The actual mechanism provided for supporting and adjusting the position of a fence may take any of a number of forms. In the particular embodiment of the invention (see FIGS. 1 and 4), a fence may be provided with a threaded shaft such as the one shown at 58, with the shaft having an end secured to the fence. The shaft extends through a suitable bore in strap 62, and through a collar 64 joined to a side of strap 62. A set screw 65 is mounted in collar 64. With loosening of the set screw, shaft 58 may be shifted relative to the collar, and the set screw is tightened to secure the shaft in a given position.

Figure 2:
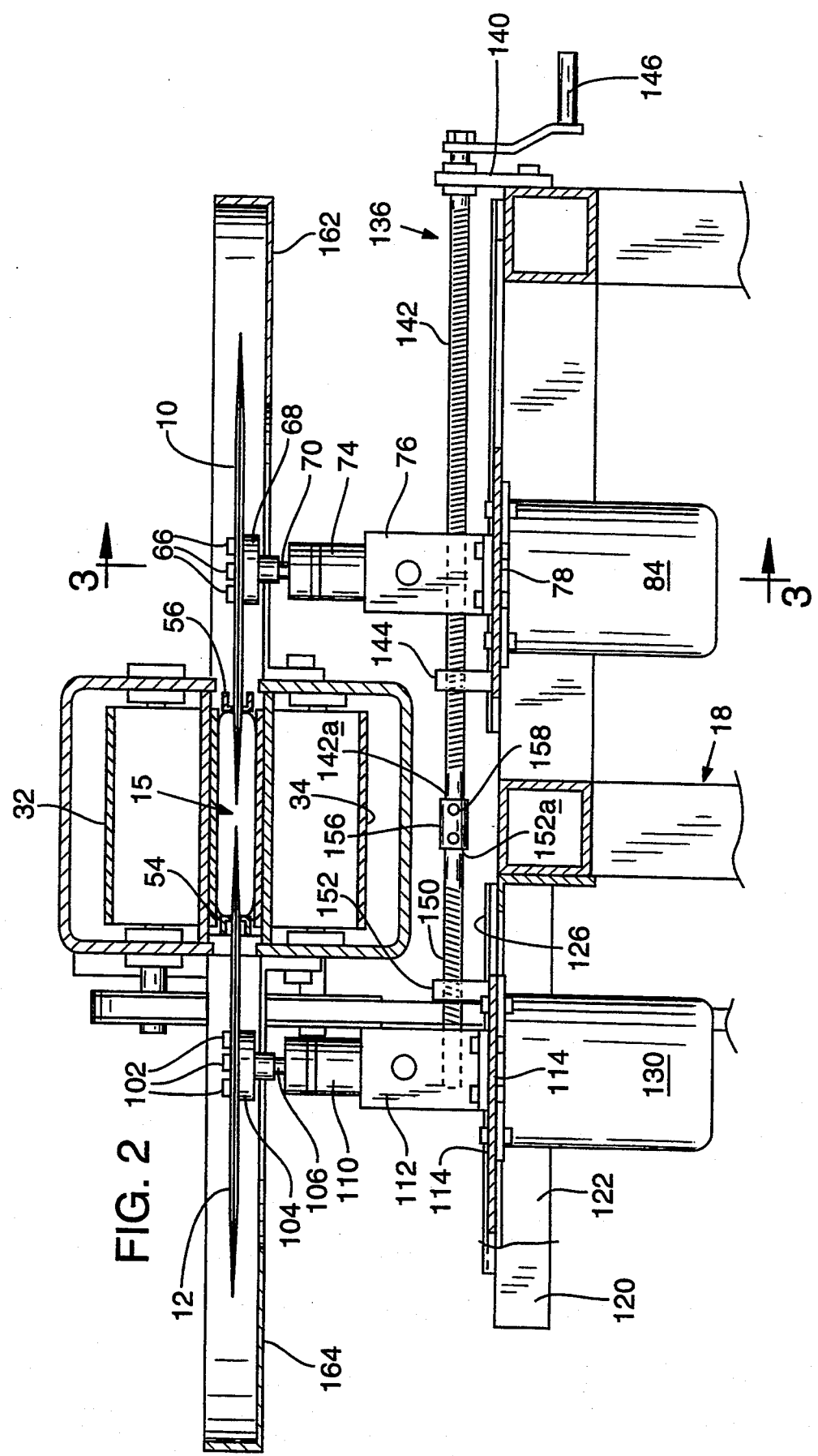
FIG. 2 is a cross-sectional view, taken generally along the line 2—2 in FIG. 1.

In FIGS. 1 and 2, cutter blades 10 and 12, which have circular peripheral outlines, are shown with a segment or portion of the blade overlying conveyor belt 34 and projecting inwardly from a margin of the belt. Thus, in FIG. 2, cutter blade 10 projects inwardly over the right margin of belt 34, and cutter blade 12 projects inwardly over the right margin of belt 34. The region where these blades project inwardly for cutting purposes is what constitutes the cutting station. Fences 54, 56 are suitably slotted at this cutting station to permit the cutter blades to project through the fences in this region.

Each of the cutter blades is provided with a motor for powering the blade, such as an electric motor. It has been found convenient to mount a blade by coupling the blade to an output shaft driven by the motor, and to mount the motor through its housing on a rail system, which enables the motor and the blade which it rotates, to be adjusted in position.

Further explaining, and referring to FIGS. 1, 2 and 3, cutter blade 10 is secured by screw fastener 66 to a hub 68 suitable secured to the upstanding end of a vertical power-driven shaft 70. Shaft 70 is rotatably supported on a mount 74 secured to the top of a mounting bracket 76. The bracket is fastened to the top of a carriage plate 78.

Secured to the underside of the carriage through its housing is an electric motor 84. The motor has an output shaft 86 coupled by means including coupler 88 to shaft 70. With the construction described, energizing of the motor produces, by reason of a direct coupling to the motor's outputs shaft, rotation of shaft 70 and the cutter blade secured thereto.

Framework 18 of the apparatus includes a pair of frame elements 92, 94 (see FIGS. 1 and 3) disposed in a position extending generally transversely of conveyor belts 32, 34. Suitably secured to the top sides of these frame elements are elongate guide flange elements 96, 98. Opposite margins of carriage plate 78 are captured by guide flange elements 96, 98. The guide flange elements, and the frame elements beneath them, provide a track or rail system mounting the carriage plate and the motor which it supports for movement in a path extending transversely of the conveyor belts.

A similar drive system and movable mounting is provided for blade 12. Thus, the cutter blade is secured by detachable screw fasteners 102 to a mounting hub 104 secured to the top of a shaft 106. The shaft is rotatably supported in a mount 110 fastened to the top of a mounting bracket 112. The mounting bracket is disposed above and secured to the top of a carriage plate 114.

The framework of the apparatus includes spaced frame members 120, 122. Guide flange elements 126 secured to the top of these frame members capture the opposite margins of carriage plate 114 while accommodating movement of the carriage plate in a path which is the same path of the path of movement provided for plate 78 on the opposite side of the conveyor belt.

An electric motor 130, through its housing, is mounted on the underside of the carriage plate 114. The output shaft of the motor is coupled for driving purposes to shaft 106 which mounts cutter blade 12.

What has been described is a rail system which mounts the motors for movement along a common path extending transversely of the belts.

Adjustable mechanism, shown generally at 136, is provided which may be actuated to produce shifting of the carriage plates 78, 114 along their common path, and with such shifting a change in the relative spacing of cutter blades 10, 12.

Specifically, rotatably supported adjacent one end by an upstanding bracket 140 is an elongate worm shaft 142 terminating at an end 142a. Between its ends, the shaft is received within a threaded follower 144 mounted in an upright position on plate 78. Turning of the shaft produces movement of the follower and the carriage plate underneath it, either to the right or to the left in FIG. 2, depending upon the direction of rotation. Rotation of the shaft by hand is expedited by the provision of a handle 146.

Another shaft is shown at 150 which is received within a threaded follower 152 secured to and extending upwardly from carriage plate 114. Turning of the threaded shaft produces movement of the follower and the carriage plate beneath it, either to the left or to the right, depending upon the direction of rotation of the shaft.

Shaft 150 and shaft 142 are threaded in the opposite direction.

Figure 7:
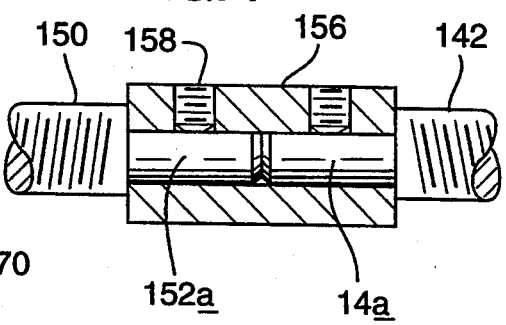
FIG. 7 illustrates a detachable coupling for coupling the ends of shafts together.

The two shafts are detachably connected at their ends 142a, 150a by a coupler 156 (see also FIG. 7). Each of the shafts at its end has a reduced diameter and is flat along one side. The coupler is nonrotatably received on the end of each shaft, and is secured in place, as with screws 158.

Extending under the bottom and in protective relationship around the exposed extremity of each cutter blade is a guard, shown for blade 10 at 162, and for blade 12 at 164.

With the construction described, with turning of handle 146 in one direction, blades 10 and 12 are caused simultaneously to move relative to each other away from each other. With turning of the shaft in the opposite direction, the blades are caused to move simultaneously toward each other. With the blades positioned as shown in FIG. 2 relative to fences 54, 56, and with the bakery product moving down the conveyor belts which essentially fills the space between the fence elements, a so-called butterfly cut is produced in the bakery product. With a butterfly cut, cuts are made extending inwardly from opposite sides of the product to leave a hinge, or region of joinder, which is not cut, extending centrally along the product. Adjusting the position of the blades using the handle as just described is effective to increase or decrease the width of the center hinge produced.

The apparatus described can also be used in the production of a side hinge-type joint between the cut portions of the product processed. To produce this type of cut, the two worm shafts are disconnected from each other, by removing coupler 156. Motor 130 and the cutter blade which it rotates may then be moved to one side, or to the left as illustrated in FIG. 2 along the guide path provided by guide flange elements 126. This shifts the cutter blade 12 so that it becomes positioned completely to the left of fence 54, leaving the region extending to the right of this fence free of blade 12. Shaft 142 may then be turned to shift motor 84 and its cutter blade to the left in FIG. 2, to place its cutting edge closer to fence 54. With this adjustment, and on a product such as a bun moving down through the cutting station by the action of belts 32, 34, the bun is cut from one side only, to produce a side hinge connecting the two cut halves produced.

The circuitry provided for connecting the electric motors to a power supply enables the supply of electrical power to motor 130 to be cut off independently of the supply to motor 84. This is a safety procedure which disables one cutter blade when producing a cut using only the other one. This circuitry is exemplified by power supply 166 connected to motor 130 through switch 168, and connected to motor 84 through switch 170.

Figure 6:
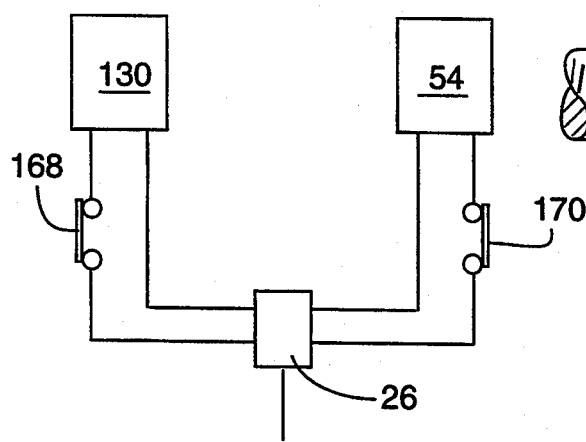
FIG. 6 is a simplified view of control circuitry which may be used.

It should be obvious that the mountings (see FIG. 6) for the drive system in the apparatus disclosed are subject to variation, and other forms of adjustment means and mechanisms may be provided for changing the relative position of the parts.

While a particular embodiment of the invention has been described, it should be obvious that variations are possible without departing from the invention.

It is claimed and desired to secure by Letters Patent:

1. A bakery product slicing machine comprising:
   an elongate conveyor defining a path for the transport of bakery products therealong,
   a first rotatable cutter blade of circular peripheral outline disposed with a segment of the blade overlying said conveyor and projecting in from one margin of the conveyor,
   a fence extending in a position above and longitudinally of the conveyor adjacent an opposite margin of the conveyor,
   a mounting for the first cutter blade supporting the blade, said mounting including a guide structure supporting the first cutter blade for movement in a path extending transversely of the conveyor and a first adjustable mechanism for adjusting the position of the blade and producing adjusted positioning of the outline of the blade to different positions within a region extending from said fence to said one margin of the conveyor,
   a second rotatable cutter blade of circular peripheral outline and guide structure supporting the second cutter blade for movement in a path extending transversely of the conveyor from an inoperative position for the second cutter blade wherein the second blade is to one side of the conveyor and away from any cutting contact with material on the conveyor and an operative position where a segment of the second blade overlies said conveyor and projects inwardly from said opposite margin into said region extending from said fence to said one margin of the conveyor,
   a second adjustable mechanism for adjusting the position of the second cutter blade along its guide structure, and
   a disconnectable connector interconnecting the first adjustable mechanism for the first blade and the second adjustable mechanism for the second blade such that the two blades may be simultaneously adjusted, disconnecting of said disconnectable connector freeing the adjustable mechanism for the first blade and the adjustable mechanism for the second blade such that the first adjustable mechanism and the second adjustable mechanism operate independently of each other.

2. A bakery product slicing machine comprising:
   a frame,
   a first motor with an upstanding output shaft and a second motor with an upstanding output shaft,
   a rail system mounting the first and second motors with both the motors movable on the rail system along an elongate path,
   a first adjustable mechanism for the first motor actuatable to adjust the position of the first motor by moving the first motor along said path,
   a second adjustable mechanism for the second motor actuatable to adjust the position of the second motor by moving the second motor along said path,
   detachable means for interconnecting said first adjustable mechanism for the first motor and said second adjustable mechanism for the second motor, whereby actuation of said first adjustable mechanism produces simultaneous actuation of said second adjustable mechanism, with the two motors moving in opposite directions along said path, detachment of said detachable means freeing the motors for independent adjustment,
   a first rotatable cutter blade connected to the output shaft of the first motor and adjusted in position with adjustment in the position of the first motor and a second rotatable cutter blade connected to the output shaft of the second motor and adjusted in position with adjustment in the position of the second motor, the blades occupying a common horizontal plane, and
   an elongate conveyor for transporting product with the product moving between said blades.

3. The slicing machine of claim 2, where the motors are electric motors, and further including circuitry for connecting an electric power source with said motors, the circuitry including switch means for disconnecting the power source from said second motor independently of disconnecting the power source from said first motor.

4. The bakery product slicing machine of claim 2, which further includes a fence above and extending longitudinally of said conveyor for guiding product moved by the conveyor, said first and second motors having a position where the blades connected to their said output shafts both extend at least partially over said conveyor in a region to one side of said fence, and with detachment of said detachable means said second motor is positionable to place the second cutter blade completely on the other side of said fence.

* * * * *